United States Patent [19]
Phillips et al.

[11] Patent Number: 5,736,034
[45] Date of Patent: Apr. 7, 1998

[54] PROTEIN REMOVAL SYSTEM

[75] Inventors: James William Phillips, Jacksonville; Kurt Steven Bottcher, Jr., New Port Richey, both of Fla.

[73] Assignee: James W. Phillips, Jacksonville, Fla.

[21] Appl. No.: 697,543

[22] Filed: Aug. 27, 1996

[51] Int. Cl.⁶ .................. C02F 1/24; B03D 1/24; B04C 5/08
[52] U.S. Cl. .................. 210/169; 210/703; 210/788; 210/221.2; 210/512.1
[58] Field of Search .................. 210/703, 221.2, 210/788, 787, 789, 512.1, 169

[56] References Cited

U.S. PATENT DOCUMENTS

| | | |
|---|---|---|
| 3,669,883 | 6/1972 | Huckstedt . |
| 3,719,278 | 3/1973 | Kolfertz . |
| 3,772,192 | 11/1973 | Huckstedt . |
| 3,884,186 | 5/1975 | Hickey . |
| 3,994,811 | 11/1976 | Cohen et al. . |
| 4,834,872 | 5/1989 | Overath . |
| 5,078,867 | 1/1992 | Danner . |
| 5,122,267 | 6/1992 | Giovanetti . |
| 5,282,962 | 2/1994 | Chen . |
| 5,380,160 | 1/1995 | Chen . |
| 5,484,525 | 1/1996 | Mowka, Jr. . |

FOREIGN PATENT DOCUMENTS

| | | |
|---|---|---|
| 2364181 | 5/1978 | France . |
| 1289353 | 2/1969 | Germany . |
| 2162092 | 1/1986 | United Kingdom . |
| 96/07483 | 3/1996 | WIPO . |

Primary Examiner—Thomas M. Lithgow
Attorney, Agent, or Firm—Saliwanchik, Lloyd & Saliwanchik

[57] ABSTRACT

The subject invention concerns a process for removing proteins from aquarium waters. The protein is efficiently removed from the aquarium water (salt or fresh) by contacting the water with a vortex air/water bubble pattern. The protein attaches to the bubbles and the bubbles are then skimmed from the aquarium water.

7 Claims, 3 Drawing Sheets

PROTEIN REMOVAL SYSTEM

BACKGROUND OF THE INVENTION

The health of marine animals and plants kept in aquariums depends primarily on the cleanliness and oxygenation of the water. Examples of impurities which commonly degrade the aquarium environment are those in the form of suspended solids, such as fish wastes and uneaten food, and those which are liquid or dissolve in the water, such as dissolved protein and ammonia from urea. All such impurities affect the desired chemical balance of the water and determines to a great extend the frequency with which the water must be changed. Accordingly, a great number of products for filtering and treating aquarium water have been developed.

There are many systems which have been proposed for use in removing wastes from aquariums and other aqueous environments. In the case of aquariums, these systems use a variety of means to purify the water and make the aquarium environment healthy for the fish and other aquatic pets. For example, mechanical filters can be used to trap and remove debris and particulate matter. Biological filters can be used to remove ammonia through the action of microbes.

Organic deposits have been removed from aquariums utilizing foam fractionation induced within a column in which air bubbles injected into the water within the column collect hydrophilic molecules and carry them to the water surface to create a removable foam. As is known in the art, many of the organic substances such as protein deposits within an aquarium are surface active polar molecules which will bond to the surface of bubbles. As the bubbles rise through the water, they carry the bonded surface active material with them to form a foam at the water surface. In some systems, the air bubbles may flow in the same direction as the water flow, and in other systems, counter flow may occur. When the bubbles reach the surface of the water, the impurities collect as a foam and may be skimmed off. The foam is typically discarded as a waste product.

These protein skimming devices are useful in salt water aquariums. However, such protein skimming devices are not very useful in fresh water because, unfortunately, they do not do a very good job in removing protein wastes from fresh water.

Examples of protein skimming systems and particular components of such systems are well known to those skilled in the art and can be found, for example, in the following U.S. Patents: U.S. Pat. No. 5,380,160, Power Head Assembly for a Protein Skimmer; U.S. Pat. No. 3,994,811, Protein Skimmer and Carbon Filtration Replaceable Unit; U.S. Pat. No. 3,719,278, External Filters for Aquaria; U.S. Pat. No. 5,484,525, Foam Fractionation Protein Skimmer Assembly; U.S. Pat. No. 4,834,872, Aeration/Flotation Reactor; and U.S. Pat. No. 5,078,867, Aquarium Filter/Protein Skimmer System.

Previously known protein removal systems are not very effective in fresh water aquarium environments. Even in salt water systems there is room for improvement in the efficiency of protein removal systems.

BRIEF SUMMARY OF THE INVENTION

The subject invention pertains to a new protein skimmer which effectively removes proteins from aqueous environments. Advantageously, the protein removal system of the subject invention is particularly useful in the aquarium field because it can be used to remove wastes from either salt or fresh water aquariums. This result is achieved by use of a system which creates a unique and advantageous bubble pattern in the water. In the case of aquariums, the protein skimmer may be hung on the side of an aquarium or used in an adjacent sump. Proteins can also be removed from other liquid environments.

The bubble pattern generated by the device of the subject invention is a tight vortex pattern. Unexpectedly, it has been determined that this vortex bubble pattern greatly enhances the removal of protein wastes from either fresh water or salt water aquariums. Therefore, the device of the subject invention can be used for waste removal in a variety of aquarium systems.

The water/air vortex used to remove proteins according to the subject invention can be created using a variety of means. In a specific example, a mixture of air and water is initially pumped into a bottom chamber of a cylinder. Extending above this initial bottom chamber is a narrower cylinder. Water exits the bottom chamber and enters the more narrow cylinder. Because the diameter of the inner cylinder is less than that of the bottom chamber, the speed of circulation of the water increases as the flow passes through the inner cylinder. This enhanced speed of circulation creates a tight vortex pattern of flow. The tight vortex pattern is very advantageous for protein removal purposes because surrounding water is efficiently drawn into the vortex thus increasing the contact between the air bubbles and water.

This vortex bubble pattern has been found to be highly efficient in removing proteins from water. The proteins in the water attach to the bubbles which then rise to the top of the column. Upon reaching the surface of the water, these bubbles form a foam which has the proteins attached thereto. The foam, and thus the proteins, can then be readily removed.

The subject invention fills a void in prior art protein removing systems because it can be used to remove proteins from fresh water aquariums. Even in salt water systems the protein skimmer of the subject invention is advantageous because of its effective removal of proteins and because of its unique appearance.

DETAILED DISCLOSURE OF THE INVENTION

The subject invention pertains to materials and methods useful for the efficient removal of proteins and other hydrophilic molecules from aqueous solutions. In a specific embodiment, the subject invention provides a device which removes proteins from aquarium water. Surprisingly, the protein skimmer system of the subject invention can be used to remove proteins from either fresh or salt water.

The removal of proteins from aqueous environments by the system of the subject invention is accomplished by passing air bubbles through the water. Proteins and other impurities attach to the air bubbles. The device of the subject invention generates bubbles which are forced into a vortex pattern as they rise through the water. The vortex pattern of bubble flow has been found to be particularly advantageous in removing proteins from aquarium water. The proteins attach to the bubbles which are generated by the device of the subject invention and these bubbles, with the attached proteins, are ultimately collected and the attached proteins, and other attached waste compounds, can be readily disposed of.

Figure 1:
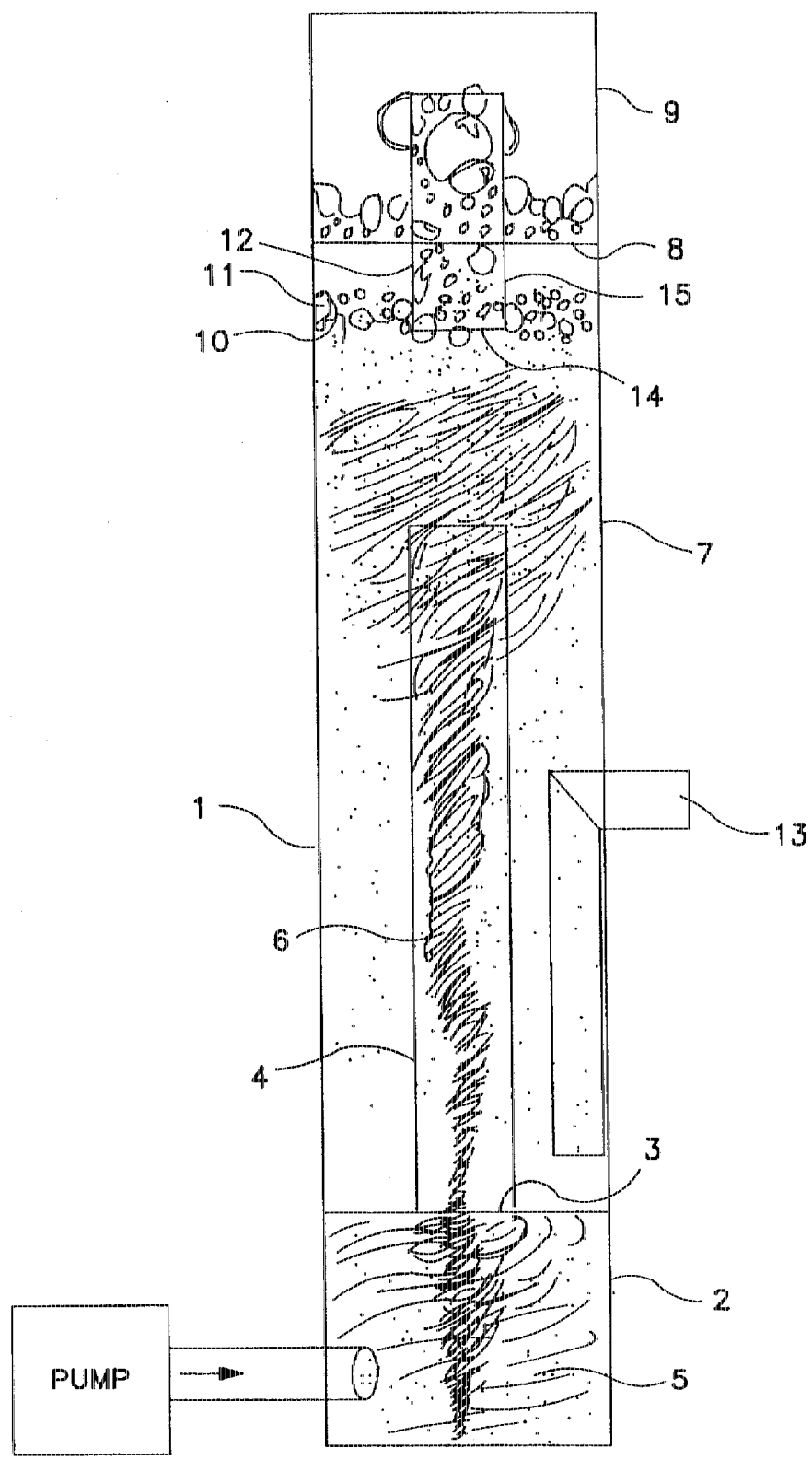
FIG. 1 shows a protein removal system of the subject invention wherein an air and water mix is initially pumped into the bottom chamber of a cylinder. The air/water mix is introduced into the bottom chamber in such a way as to create a circular flow in the bottom chamber. The air/water mix leaves the bottom chamber through a hole at the top of the bottom chamber and flows into a more narrow inner cylinder. Upon entering the inner cylinder, the air/water mix becomes a tight flow vortex which rises through the inner cylinder. The bubbles, with protein attached, ultimately reach the surface of the water where they form a foam. The foam and accompanying proteins are then readily removed.

A specific embodiment of the subject invention is shown in FIG. 1. As shown in FIG. 1, a master cylinder 1 is provided through which aquarium water flows. The main cylinder 1 of the subject invention can be of any appropriate size to facilitate adequate treatment. Thus, the size would typically depend on the flow rate needed to operate the system. The protein skimmers of the subject invention can be built to accommodate virtually any flow rate. Smaller skimmers may be used which have a flow rate of about ½ gallon per minute or less. Larger skimmers for commercial operations can treat 100 gallons per minute or more.

Air bubbles and water are mixed and introduced into a bottom chamber 2 of the master cylinder 1. In a preferred embodiment of the subject invention, water is drawn from an aquarium and is pumped into the protein skimmer. Typically, the water would be drawn by a pump which is able to concurrently introduce air bubbles into the water flow. The introduction of air bubbles can be achieved utilizing, for example, a venturi effect which draws air into the water flow. It will be appreciated by those skilled in the art that an additional advantage of the protein skimmer as described herein is the efficient aeration of the water.

Figure 2:
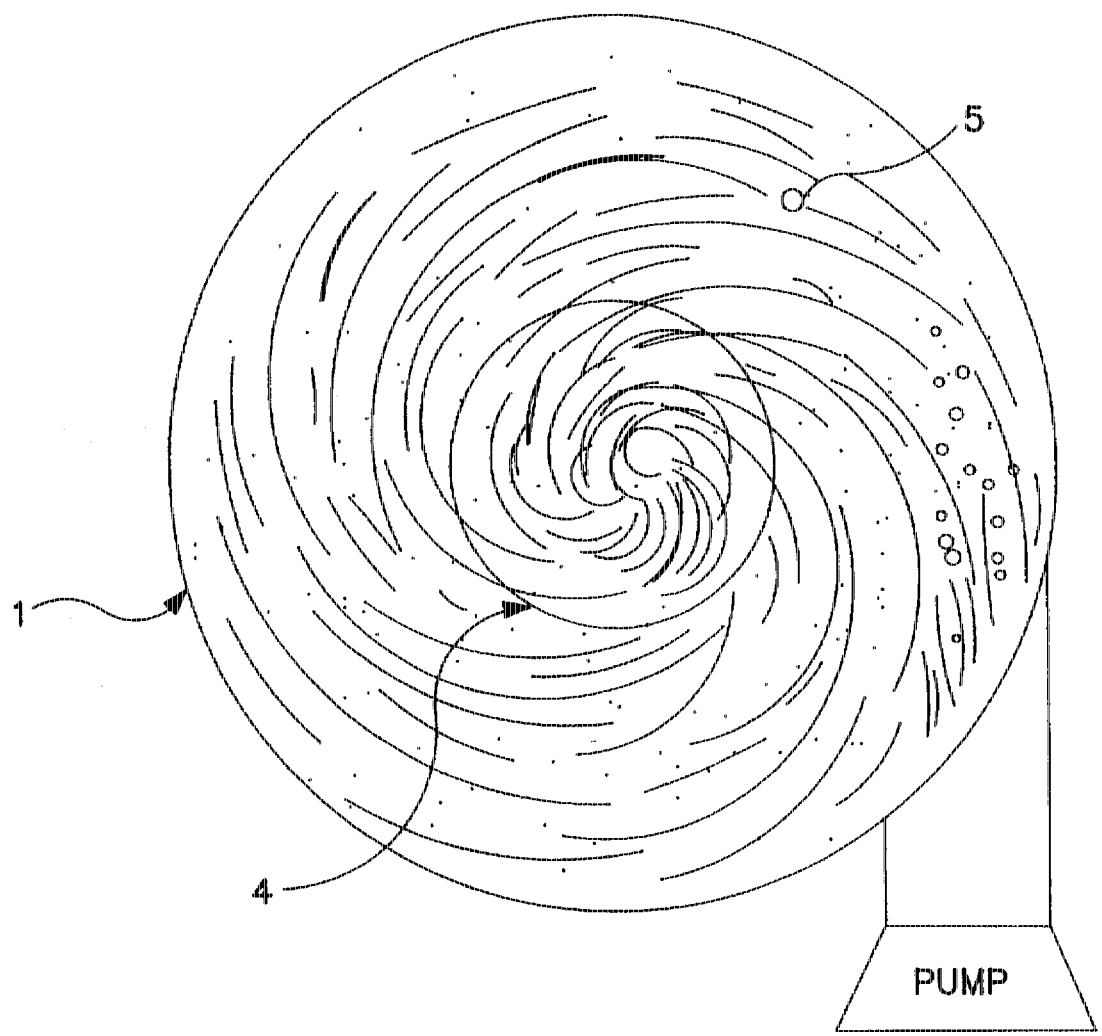
FIG. 2 is a top cross-sectional view showing the flow pattern in the bottom chamber of the protein skimmer of the subject invention.

In a specific embodiment, a water/air mix is introduced along the periphery of the bottom chamber 2 of the master cylinder 1 so as to create a strong circular flow within the bottom chamber. See FIG. 2. In a specific embodiment, the inlet tube is cut flush with the edge of the bottom chamber so as not to impede the circular flow of the water. Because of the buoyancy of the air bubbles as well as the flow of the water, the water/air mix must exit through an opening 3 at the top of the bottom chamber.

The diameter of the bottom chamber may range from less than one inch to many feet. Preferably, the diameter of the bottom chamber will be from about 2 inches to about 24 inches. In a specific embodiment, the bottom chamber is about 3 inches in diameter. The height of the bottom chamber can vary from less than one inch to several feet. Preferably, the bottom chamber is about ½ inch to about 12 inches in height. In a specific embodiment the bottom chamber is about 2 inches high. Typically, the bottom chamber will be from about one twentieth to about one half the height of the master cylinder. Preferably, the bottom chamber will be about one-fourth the height of the master cylinder.

Air bubbles and water which enter the bottom chamber 2 exit the chamber through a hole 3 in the top of the chamber. The top of the bottom chamber may be shaped to help direct the flow into the hole 3. The shape may be a funnel, for example. The hole in the top of the bottom chamber 3 leads directly into an internal cylinder 4 which has a smaller diameter than the master cylinder 1. For example, the inner cylinder 4 may have a diameter of about one fourth the diameter of the master cylinder 1.

When air bubbles and water are introduced into the bottom chamber 2 they are introduced at a speed and direction so as to create a strong circular flow 5 of water and bubbles about the axis of the master cylinder 1. This strong circular flow is enhanced as the air bubbles exit the bottom chamber 2 and enter the smaller inner cylinder 4. The inner cylinder is preferably centered above the center axis of the bottom chamber. This strong circular flow creates a spinning vortex of air bubbles 6 which rises through the inner cylinder 4 and exits the inner cylinder which terminates within a middle chamber 7 of the master cylinder 1.

In one embodiment, upon exiting the inner cylinder 4, the bubble vortex 6 continues to rise through the water in the middle chamber 7 until the bubbles reach the water surface 10 which is a short distance below a partition 8 between the middle 7 and upper 9 chambers of the master cylinder 1.

Figure 3:
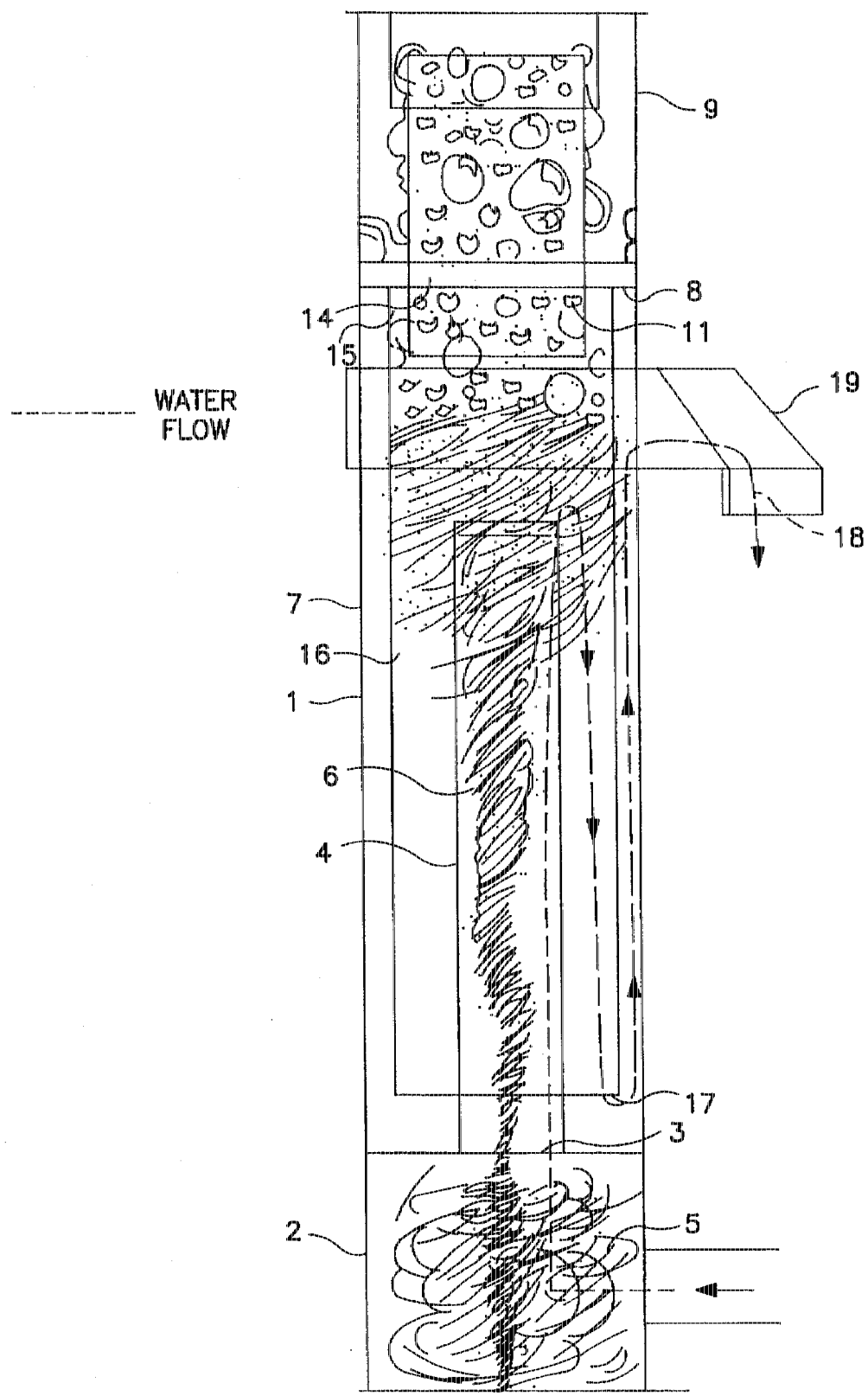
FIG. 3 shows a protein skimmer of the subject invention with a partition in the middle chamber and with a bracket to hang the device on an aquarium.

In another embodiment, there may be a partition 16 within the middle chamber which forces the flow of water down and underneath 17 the partition towards the outer edge of the middle chamber before the flow exits at the periphery of the middle chamber 18. See FIG. 3. In this embodiment, the water would typically exit near the top of the middle chamber 18. FIG. 3 also shows a bracket 19 which can be used to hang the protein skimmer on the side of the aquarium.

The middle chamber 7 will typically be the same diameter as the bottom chamber but will be longer. For example, the middle chamber will typically be between several inches and several feet high. Preferably, the middle chamber will be between about 2 inches and about 36 inches high. In a specific embodiment the middle chamber is about 12 inches high. Rising up through the middle chamber 7 is the inner cylinder 4. As noted above, the inner cylinder 4 has a smaller diameter than the bottom 2 or middle 7 chambers and is shorter than the middle chamber 7. As noted above, there can be another cylinder between the inner cylinder and the master cylinder which acts as a partition in the middle chamber. Typically, the inner cylinder 4 will have a diameter which is from about one-tenth to about one-half of the diameter of the master cylinder. Thus, the diameter of the inner cylinder will typically be between about ¼ inch and about 10 inches. Preferably, the inner cylinder will have a diameter between about ½ inch and 5 inches. In a specific embodiment, the master cylinder has a diameter of about 3 inches and the inner cylinder has a diameter of about 1 inch.

In a specific embodiment, the middle chamber 7 has a port 13 for water to flow out. Thus water flows into the middle chamber 7 as it exits the inner cylinder 4 and water exits the middle chamber 7 through the outlet port 13. In one embodiment, this outlet port 13 will be located near the bottom of the middle chamber 7. The size of the outlet port 13 will typically be between about ⅛ inch and about 1 inch. In a specific embodiment, the outlet port has a diameter of about ¼ inch. The size and shape of the outlet port can be modified by a person skilled in this art, having the benefit of the instant disclosure, to achieve the desired flow rate.

The flow rate of water into the protein skimmer of the subject invention is controlled such that the water level in the middle chamber 7 remains at a relatively constant level below the partition 8 which separates the middle 7 and upper 9 chambers. Flow rates for protein skimmers can be, for example, approximately 1 to 2 times the size of the aquarium per hour. Thus, for an 80-gallon tank, the flow rate may be, for example, about 80 to about 160 gallons per hour. The flow rate for a master cylinder having a diameter of about 3 inches can be, for example, between about 1 and about 5 gallons per minute. In a specific embodiment the flow rate will be about 3 gallons per minute.

As the bubble vortex rises first through the inner cylinder 4 then through the middle chamber 7 of the master cylinder 1, proteins and other compounds attach to the surface of the bubbles. Once the bubbles reach the surface of the water 10, near the top of the middle chamber 7, they create a foam 11 at the surface of the water. This foam contains proteins and other compounds which have been removed from the aquarium water. In a preferred embodiment, pressure reduces from the edge to the center of the tight vortex. This pressure drop enhances the ability of the protein skimmer to provide excellent contact between the bubbles and the water to be treated. In a preferred embodiment, the edge of the tight vortex is clearly visible within the inner cylinder and is defined by a pattern of spinning bubbles which do not substantially contact the inner cylinder.

Foam 11 formed at the surface 10 of the water in the middle chamber 7 passes through an opening 14 into an upper chamber 9 where the foam, and attached protein, collects and can be readily removed. In a preferred embodiment, a tube 15 extends between the middle 7 and upper 9 chambers providing a conduit through which the foam can easily pass. Typically, this tube will be between about the same size as the inner tube. In a specific embodiment this tube is about 1 inch in diameter. The tube can be, for example, about 4 inches long. In a specific embodiment, this tube may be formed so as to direct the foam into the tube and up to the upper chamber. Thus, this tube may have, for example, a funnel shape.

The upper chamber may be any of the well-known designs for collecting and disposing of foam from protein skimmers. A person skilled in this art, having the benefit of the instant disclosure, could readily design an appropriate collector.

The protein skimmer of the subject invention can be used in a variety of aquaculture systems. Aquaculture is a term used generally to describe a variety of methods and systems for producing plants and animals in water environments. Thus, aquaculture can involve not only the cultivation of fish but also includes the cultivation of many aquatic plants and a variety of aquatic animals in addition to fish. Alligators, crawfish, frogs and seaweed are routinely cultivated by aquaculture. Additionally, the popularity of fresh and salt-water aquariums has enjoyed a resurgence further adding to the demand for better aquaculture systems.

Providing for artificial cultivation of fish and other animals in populations far more dense than in nature, is a difficult prospect. Adequate food and oxygen must be supplied to the population. Further, waste must be continuously removed from the water. Semi-closed aquaculture systems have been developed in which water is recirculated within the system. Only small amounts of new water are added periodically in a semi-closed system. Oxygen and nutrients are added to the recirculating water and waste is removed through appropriate filtration and treatment systems.

Waste can be removed from a semi-closed system by utilizing any or all of three types of "filtering" means: mechanical, chemical, and biological. Particulate matter can be removed by a mechanical type filter which physically removes solid waste from the water. Mechanical filtration is often the initial step in a filtration process because particulate waste eventually breaks down and can interfere with the operation of other filters. Chemical filters typically absorb or adsorb dissolved organic compounds from the water. The protein skimmer of the subject invention can be used in any aquaculture system where it is desired to remove proteins. The protein skimmer can be used in conjunction with other mechanical, chemical, or biological filtering systems.

The liquid from which proteins are removed according to the subject invention can be any liquid containing proteins which need to be removed. Where the invention process is used to purify aquariums of protein wastes, the liquid can be either salt or fresh water. The subject invention process works effectively in either liquid. The basic teaching of the subject invention disclosure can be used in the recovery of valuable protein products produced via chemical and/or fermentation processes. This recovery of protein would be an initial step in the purification of a desired protein. Where the protein to be recovered resides in a chemical reaction liquid, or a fermentation liquid, then the subject invention process can be used in either one to facilitate the recovery of the desired protein. The subject invention process can be used in any aqueous liquid system from which a protein material is desired to be removed. Thus, it can be appreciated that the basic nature of the subject invention is indeed a pioneer invention which has extensive importance in the fields of liquid purification and protein recovery.

The protein skimmer of the subject invention can be constructed from a variety of materials. As exemplified, the skimmer is designed for use in aquarium or aquaculture systems. The pans and pieces of this skimmer therefore should be resistant to rust and corrosion. Further, the materials from which the skimmer is made should be able to be sealed so that the skimmer is water-tight. Plastics are resistant to rust and corrosion and can be caulked with silicon or other sealants to ve water-tight. Clear plastics can be used for the main cylinder and inner cylinder to allow visual monitoring of the flow within the system. Other materials from which parts can be constructed include materials such as stainless steel or any material that has sufficient rigidity and tensile strength to hold the form of the skimmer and withstand the force of the flow rate.

The protein skimmer of the subject invention can be provided in a kit for home aquarium use. The kit can comprise the protein skimmer and a pump, such as a seven watt pump commonly used in aquarium systems. The pump provides the skimmer with an adequate flow rate of aquarium water to create the vortex flow. The kit can further comprise a mechanical, sponge-type filter and/or biological filters to remove particulate and nitrogenous waste.

The mechanics of operation disclosed herein are merely to exemplify the invention process. A person skilled in the an of aquariums, or other protein recovery processes, can make a number of modifications and still have an air/liquid vortex bubble pattern to recover desired protein(s). It is this vortex bubble pattern which gives the highly effective protein recovery results achievable with the process of the subject invention.

Persons skilled in the art of protein recovery will readily recognize the many uses of the subject invention system. Modifications of the invention system to fit uses other than aquarium uses can be readily made by persons skilled in the various protein recovery arts.

Following are examples which illustrate procedures for practicing the invention. These examples should not be construed as limiting. All percentages are by weight and all solvent mixture proportions are by volume unless otherwise noted.

EXAMPLE 1

Protein Skimmer for Aquarium

A description of one specific embodiment of a protein skimmer of the subject invention is as follows with reference to FIG. 1.

Water is drawn from an aquarium to which the pump P is attached. An air line into the pump P allows for the water and air to mix. This air/water mix is then discharged into the bottom chamber 2 of a master cylinder 1. Extending upwardly and centrally is another cylinder 4 which is approximately ⅓ the diameter of cylinder 1. Cylindrical columns are exemplified but other shapes or configurations may be used so long as the desired air/water flow pattern can be obtained. From the bottom chamber 2 the air/water mix flows into cylinder 4 as an extended vortex bubble pattern as shown in the drawing.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A process for removing proteins from an aqueous fluid which comprises contacting said aqueous fluid with air bubbles flowing in a tight vortex pattern such that proteins attach to said bubbles and create a foam, and removing said foam containing said proteins from said aqueous fluid, wherein said tight vortex pattern is formed by first introducing a water and air mix into a bottom chamber of a protein skimmer device such that said water and air mix has a circular flow pattern in said bottom chamber, and wherein said water and air mix exits said bottom chamber into an inner cylinder having a diameter less than the diameter of said bottom chamber so as to create said tight vortex flow pattern within said inner cylinder.

2. The process, according to claim 1, wherein said aqueous fluid is aquarium water.

3. The process, according to claim 2, wherein said aquarium water is salt water.

4. The process, according to claim 2, wherein said aquarium water is fresh water.

5. A device for removing protein from an aqueous fluid wherein said device comprises a master cylinder comprising the following:

(a) a bottom having inlet means for feeding a water and air bubble mixture into said bottom chamber and for creating a strong circular flow within the bottom chamber, said bottom chamber not including any turbulence generator means therein;

(b) a substantially unobstructed inner cylinder entirely located above and communicating with, said bottom chamber into which the water and air bubble mixture flows upon exiting the bottom chamber;

(c) a middle chamber through which said inner chamber extends and into which said air and water mixture flows upon exiting the inner cylinder; and (d) an upper chamber located above, and communicating with, said middle chamber into which foam collects and can be removed, wherein the diameter of said inner cylinder is less than the diameter of said bottom chamber such that water and air flowing in a circular flow pattern in said bottom chamber forms a tight vortex flow pattern upon passing through said inner cylinder.

6. The device, according to claim 5, wherein said device further comprises a bracket for attaching said device to an aquarium.

7. The device, according to claim 6, which further comprises a partition in said middle chamber such that water exiting the inner cylinder flows under said partition before exiting said device.

* * * * *

UNITED STATES PATENT AND TRADEMARK OFFICE
CERTIFICATE OF CORRECTION

PATENT NO. : 5,736,034
DATED      : April 7, 1998
INVENTOR(S) : James W. Phillips, et al.

It is certified that error appears in the above-indentified patent and that said Letters Patent is hereby corrected as shown below:

Column 6, line 30: "pans" should read --parts--; and line 51: "an" should read --art--.

Signed and Sealed this

Sixteenth Day of June, 1998

*Attest:*

BRUCE LEHMAN

*Attesting Officer*       *Commissioner of Patents and Trademarks*